United States Patent
Pawlicki et al.

(10) Patent No.: US 7,423,399 B2
(45) Date of Patent: Sep. 9, 2008

(54) APPARATUS, AND ASSOCIATED METHOD, FOR CONTROLLING THE REPETITION RATE OF AN INTERMITTENT WINDSHIELD WIPER

(75) Inventors: John A. Pawlicki, Warren, MI (US); Jason A. Sattler, Rochester Hills, MI (US)

(73) Assignee: Electronic Data Systems Corporation, Plano, TX (US)

( * ) Notice: Subject to any disclaimer, the term of this patent is extended or adjusted under 35 U.S.C. 154(b) by 98 days.

(21) Appl. No.: 11/408,486

(22) Filed: Apr. 21, 2006

(65) Prior Publication Data

US 2007/0247098 A1    Oct. 25, 2007

(51) Int. Cl.
*H02P 7/00*      (2006.01)

(52) U.S. Cl. .................. 318/443; 318/445; 318/283; 318/DIG. 2

(58) Field of Classification Search .............. 318/443, 318/445, 446, 468, 281, 282, 283, DIG. 2; 15/250.001, 250.04, 250.07, 250.12, 250.023
See application file for complete search history.

(56) References Cited

U.S. PATENT DOCUMENTS

| | | | | |
|---|---|---|---|---|
| 4,492,904 A * | 1/1985 | Graham | ...................... | 318/444 |
| 5,086,260 A * | 2/1992 | Ito | ............... | 318/266 |
| 5,525,879 A * | 6/1996 | Wainwright | ................. | 318/443 |
| 5,760,557 A * | 6/1998 | Odegaard | .................... | 318/443 |
| 5,998,883 A * | 12/1999 | Yamazaki et al. | ........... | 307/10.1 |
| 6,240,593 B1 * | 6/2001 | Murata | ....................... | 15/250.3 |

* cited by examiner

*Primary Examiner*—Rina I Duda
(74) *Attorney, Agent, or Firm*—Kelly & Krause, LP

(57) ABSTRACT

Apparatus, and associated method, for controlling intermittent operation of a windshield wiper assembly. A user interface, formed of a pair of momentary contact switches, is used to set the repetition rate of intermittent operation of a wiper blade and, subsequently, when desired, to terminate the intermittent operation. A first of the switches is actuated two times, with the time period separating the actuations defining the repetition rate of the wiper blade when in the intermittent mode of operation.

19 Claims, 4 Drawing Sheets

APPARATUS, AND ASSOCIATED METHOD, FOR CONTROLLING THE REPETITION RATE OF AN INTERMITTENT WINDSHIELD WIPER

The present invention relates generally to an intermittent windshield wiper system having a wiper blade that is caused intermittently to perform a wiping motion at a selected repetition rate. More particularly, the present invention relates to apparatus, and an associated method, that permits a user to select the repetition rate at which the wiper blade performs the wiping motion. Selection of the wiper blade repetition rate is made through use of a single momentary contact switch, or other, input actuator.

A user is able to select the exact repetition rate by selecting when to actuate, and then re-actuate, the switch. The need to rotate a dial into a dial position and estimate the subsequent repetition rate through positioning of the dial is obviated as the repetition rate is directly selected by selecting when to actuate and re-actuate the momentary contact switch.

BACKGROUND OF THE INVENTION

The use of windshield wipers to clear a vehicular windshield or other vehicular window or surface has been standard since almost the start of the automotive era. A wiper blade, rotatably affixed, or otherwise positioned, at the vehicular surface, is caused to be moved across the surface. The movement of the wiper blade causes rain, snow, ice, and other precipitation to be removed from the surface. Depending upon the amount of precipitation, the motion of the wiper blade across the surface must be repeated, sometimes at regular intervals.

While very early implementations of windshield wipers required that an operator manually apply the moving forces to cause the movement of the wiper blade across the windshield, or other, surface, pneumatic, and then, electric, actuators were soon used to provide the moving forces. Through use of the pneumatic or electrical motors to provide the moving forces, the operator no longer was required to provide the moving force. Generally, the moving forces provided by the pneumatic actuator or electric motor provide for repeated movement of the wiper blade at a fixed rate.

The rate of precipitation and the speed of movement of the vehicle are determinative of the frequency, or rate, at which the wiper blade is needed repeatedly to be moved across the windshield, or other, surface to remove the precipitation thereon. Most simply, a single-speed, viz., a simple "on-off", actuator or motor is used. When single-speed operation is provided, the wiper blade is caused to be moved, repetitively, at a single, fixed rate. Or, the actuator or motor provides more than one fixed rate of operation, e.g., a low-speed rate and a high-speed rate of operation. An operator selects which of the two, or more, fixed speeds at which the actuator or motor causes movement of the wiper blade across the windshield, or other vehicular surface. The speed is selected best to remove the precipitation falling against, or forming on, the surface that is to be cleared.

Intermittent windshield wiper operation has, in more recent years, also been provided. When in a so-called intermittent mode of operation, the rate at which the wiper blade is caused to be moved across the vehicular surface is less than at the low-speed, fixed rate. Typically more than just a single, additional, low-speed rate at which the wiper blade is movable across the vehicular surface, intermittent operation permits an operator to select any of a range of repetition rates at which the wiper blade moves across the surface.

Some conventional intermittent wiper systems utilize a rotary dial that contains multiple contacts. User rotation of the dial into a selected dial position is determinative of the selected repetition rate. While the user is able to select the repetition rate through the positioning of the rotatable dial, the user typically is unable to know precisely the selected repetition rate but through a trial-and-error process. That is to say, a user positions the dial in a first position to select an initial repetition rate. And, then the dial is again rotated, to increase or to decrease the repetition rate to obtain a repetition rate that corresponds to the desired repetition rate. Sometimes, multiple iterations of dial rotation are carried out to arrive at the desired repetition rate.

The conventional capability of merely estimating the repetition rate and then modifying the selected repetition rate until the desired repetition rate is obtained distracts the user, typically the driver of the vehicle, from other driving tasks. Any distraction of the driver when operating the vehicle in inclement weather conditions is potentially hazardous. In addition to the rotatable dial, an additional actuator is typically used, increasing the complexity and cost of the wiper assembly user interface.

An economical windshield wiper assembly, permitting intermittent operation and having a user interface permitting easier use to obtain the desired repetition rate of the wiper blade, would therefore be advantageous.

It is in light of this background information related to windshield wiper systems that the significant improvements of the present invention have evolved.

SUMMARY OF THE INVENTION

The present invention, accordingly, advantageously provides apparatus, and an associated method, for an intermittent windshield wiper system having a wiper blade that is caused intermittently to perform a wiping motion at a selected repetition rate.

Through operation of an embodiment of the present invention, a manner is provided by which to permit a user to select the repetition rate at which the wiper blade performs the wiping motion. A user selects the wiper blade repetition rate through actuation of a single momentary contact switch, or other type of input actuator.

The user actuates and then re-actuates the switch to select the repetition rate at which the wiper blade is to be caused to perform the wiping motion. The time period between the successive switch actuations sets the repetition rate. Conventional operation, required by a user to select the repetition rate through positioning of a dial into a dial position in which the repetition rate is merely estimated, sometimes requiring the user successively to reposition the dial to obtain the desired repetition rate, is obviated In one aspect of the present invention, a momentary contact switch, or other input actuator, is positioned to permit a user, such as a driver of a vehicle, easily to actuate the switch. The user selects intermittent operation of the windshield wiper by actuating the switch two times. The time period separating the successive actuations of the switch determines the rate at which the wiper blade performs the wiping motion. Once the repetition rate is selected, and the user decides to change the repetition rate, the user merely performs the same procedure of actuating and, if necessary, re-actuating, the switch to reselect the repetition rate. Through convenient positioning of the switch and providing an easily-actuatable switch, such as the aforementioned momentary contact switch, the user, when operating a vehicle, is easily able to set the wiper repetition rate. The user is little-distracted from operating the motor vehicle as the actuation of the switch is performable with minimal effort by the user.

In another aspect of the present invention, a second, momentary contact switch is also provided, positioned also to permit easy access by a user. When intermittent movement of the wiper blade is no longer needed, the user actuates the second switch to cause the intermittent operation to be terminated. Thereby, the user interface comprises merely a pair of momentary contacts switches, or other input actuators, positioned to permit their actuation by a user to set and commence intermittent movement of the wiper blade at a desired repetition rate and to terminate the intermittent movement of the wiper blade.

In another aspect of the present invention, actuation by the user of the first switch also causes immediate movement of the wiper blade to perform the wiping motion across the vehicular windshield or other surface. And, when the switch is re-actuated, the wiper blade is again caused to perform the wiping motion. Subsequently, automatic wiping motion of the wiper blade is carried out automatically at a repetition rate corresponding to the time period separating the successive actuations of the switch.

The actuation and re-actuation of the switch must be performed by the operator within a designated period, such as the time-out period of a timer. A timer function, e.g., is provided whose timing period commences with the detection of user actuation of the first switch. When the switch is re-actuated prior to timing-out of the timer, the repetition rate of intermittent operation of the wiper blade to perform the wiping motion is set. If, conversely, the user fails to re-actuate the switch within the time-out of the timer, the intermittent operation does not commence. Instead, the timer resets, and the subsequent re-actuation, if any, of the switch, causes the timing function to restart timing. If the user subsequently again actuates the switch prior to timing out of the timing function, the repetition rate is set and automatic, intermittent operation of movement of the wiper blade commences.

In one implementation, the momentary contact switches, or other input actuators, are connected to a controller and to a timer. The actuation of the first switch causes timing of the timer to commence and causes the controller to generate a control signal to operate a wiper motor to impart forces causing the wiping motion of the wiper blade. If the first input actuator is again actuated prior to timing out of the timer, the time period between the successive actuations of the switch defines the time period between successive wiping motions of the wiper blade subsequently to be performed automatically. That is to say, the repetition rate of the intermittent operation of the wiper blade corresponds to the time period between the successive actuations of the switch. To terminate the intermittent operation of the motion of the wiper blade, the user actuates the second switch. The actuation of the second switch is detected by the controller, and the controller causes a wiper motor no longer to impart the driving force to cause motion of the wiper blade. If the wiping motion of the wiper blade is partially completed when the user actuates the second switch, the wiper motor causes the wiper blade to complete its wiping motion and then terminates further wiping motions.

In a further implementation, additional overrides are provided to provide for fixed, non-intermittent operation of the wiper blade in a manner that overrides the selection of the intermittent operation.

In these and other aspects, therefore, apparatus, and an associated method, is provided for user control of intermittent movement of a wiper blade of a vehicular windshield wiper. A first actuator is actuable by the user to request movement of the wiper blade. A timer is adapted to receive indications of actuation of the first actuator. The timer is configured to determine a time period between successive actuations of the first actuator. A wiper blade movement controller is adapted to receive indications of actuation of the first actuator and of the time period determined by the timer. The wiper blade movement controller is configured selectably to cause intermittent movement of the wiper blade at a rate responsive to the time period determined by the timer.

A more complete appreciation of the present invention and the scope thereof can be obtained from the accompanying drawings that are briefly summarized below, the following detailed description of the presently-preferred embodiments of the present invention, and the appended claims.

DETAILED DESCRIPTION

Figure 1:
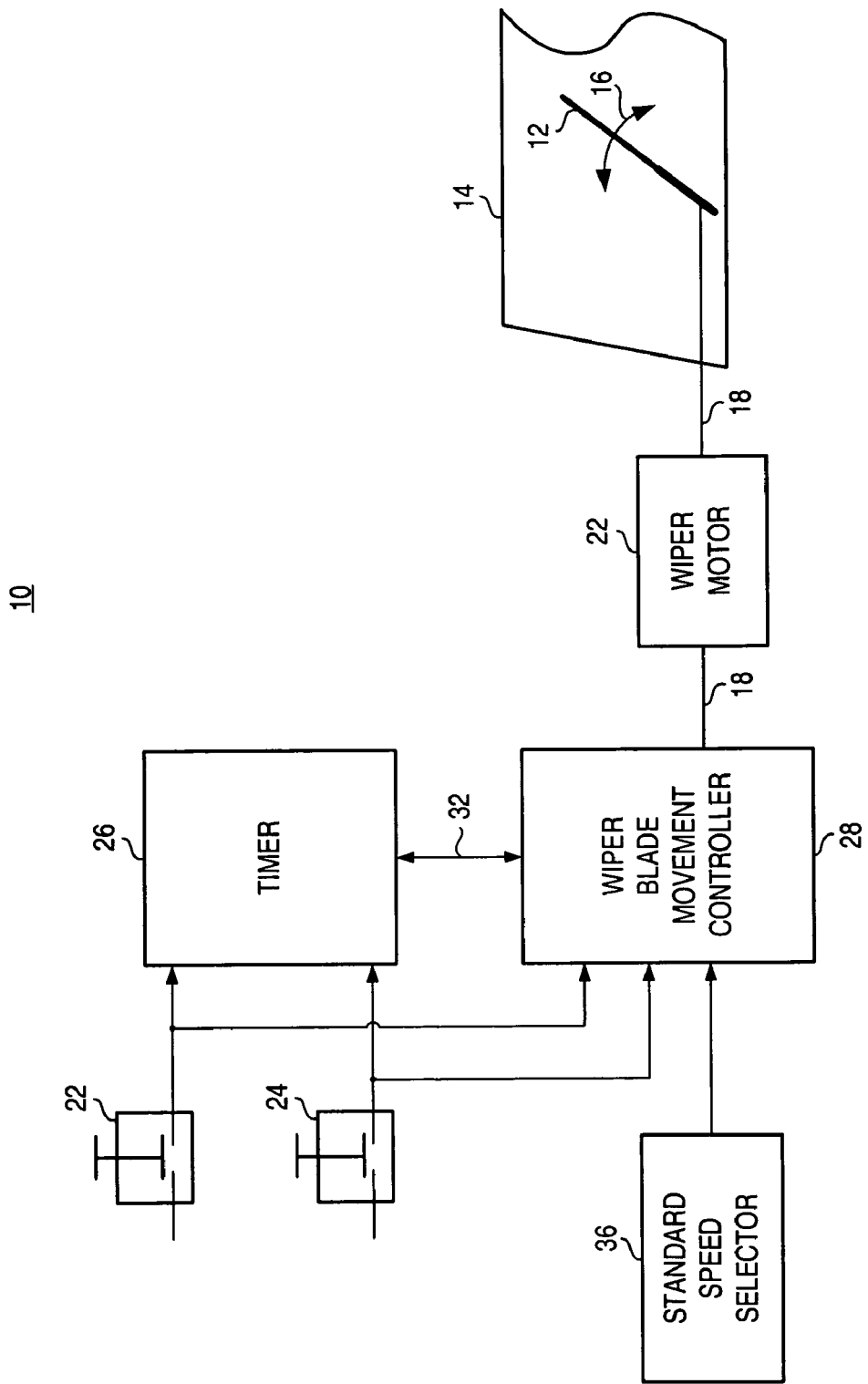
FIG. 1 illustrates a functional block diagram of the apparatus of an embodiment of the present invention.

Turning first to FIG. 1, windshield wiper control apparatus, shown generally at 10, is provided to permit a user to select, and control, intermittent operation of a windshield wiper 12. In the exemplary implementation, the windshield wiper 12 is positioned at a vehicular windshield 14, and the control apparatus controls the intermittent wiping operation of the wiper blade in directions indicated by the arrow 16 thereacross. More generally, the windshield 14 is representative of any surface, such as a back window or light fixture surface, of a structure. And, the wiper blade 12 is representative of any wiper blade positionable upon any of such surfaces.

The apparatus 10 is functionally represented, implementable, in any desired manner, including, in part, by algorithms executable by processing circuitry, by a firmware implementation, a hardware implementation or a combination thereof. When implemented at a motor vehicle, the apparatus, and the exemplary implementation, includes portions positioned at the passenger compartment of the vehicle and includes control lines, here represented by the line 18, that extend to a wiper motor 22. The wiper motor is positionable in proximity to the wiper blade 12 to impart moving forces thereto. The wiper motor here forms an electric motor. In another implementation, the wiper motor forms a pneumatic motor or actuator.

The apparatus includes a user interface, here having a first momentary contact switch 22 and a second momentary contact switch 24. The switches 22 and 24 are positioned to permit their convenient actuation by a user, e.g., the operator of the vehicle at which the apparatus is positioned. The contact switches are positioned, for instance, at the steering column or steering wheel of the vehicle or are otherwise positioned in the passenger compartment of the vehicle.

The contact switches are connected to a timer 26 and to a wiper blade movement controller 28. When the contact switch 22 is actuated by a user, the indication of the actuation is provided to the timer 26 and also to the wiper blade movement controller 28. And, similarly, when the contact switch 24 is actuated, an indication of the actuation is provided both to the timer 26 and to the wiper blade movement controller 28.

The timer and the controller are also connected, here represented by way of the line 32. In one implementation, the functions performed by the timer and the wiper blade movement controller are carried out by algorithms executable at common processor circuitry, and the line 32 is representative of exchange of information between the respective algorithms during, or as a result of, their execution. The control lines 18 extend between the controller and the wiper motor. Control signals generated by the movement controller control operation of the wiper motor, that is to say, control signals generated by the controller cause actuation of the wiper motor to generate the moving forces that cause movement of the wiper blade.

When an indication of the actuation of the contact switch 22 is provided to the timer, the timer commences timing a time-out value and also records, or times, a time period commencing with the actuation of the contact switch. If the second actuation of the contact switch is made before the expiration of the timer's time-out period, the time period between the two successive actuations of the contact switch is provided, by way of the line 32, to the movement controller 28. The time period separating the successive actuations of the contact switch 22, if performed within the time-out period of the timer, that is, prior to expiration of the timer time-out, sets the repetition rate of the intermittent operation of the wiper blade caused by the movement controller 28. If, conversely, the contact switch 22 is not actuated a second time within the time-out period of the timer, the controller does not set intermittent operation of the wiper blade. The time-out period of the timer is any desired time period, such as, e.g., a time period corresponding to the time period separating wiper blade motions during fixed, normal low-speed operation of the windshield wiper system.

The direct connection between the contact switch 22 and the movement controller 28 also provides the movement controller with an indication each time in which the contact switch is actuated. In the exemplary implementation, the movement controller, upon reception of indication of the actuation of the contact switch, generates a control signal that causes the wiper motor to generate moving forces to cause wiping motion of the wiper blade. And, when the user actuates the contact switch two times within the time-out period of the timer, the first two repetitions of the wiper blade are caused directly as a result of the actuation of the contact switch. Thereafter, subsequent repetitions of the movement of the wiper blade are caused by control signals generated by the movement controller free of additional actuations of the contact switch.

As the movement controller causes generation of the control signal to cause motion of the wiper blade responsive to actuation of the contact switch 22, the wiper blade is caused to perform the wiping motion even when a second actuation of the contact switch occurs subsequent to the timing out of the timer 26. The second actuation of the contact switch, occurring beyond the time-out period of the timer, is treated by the timer as a new, first actuation of the contact switch for purposes of setting automatic, intermittent operation of the wiper blade.

The second contact switch 24 is actuated by the user to terminate the intermittent operation in which the wiper blade is intermittently caused to perform the wiping movement at the selected repetition rate. Upon detection of the actuation of the second contact switch 24, the movement controller prevents further operation of the wiper motor to cause the wiper blade to perform another wiping motion. If the indication is detected in mid-motion of the wiper blade, the wiping motion of the wiping blade is completed.

Thereby, a simple user interface permits a user, such as a driver of a vehicle to set the intermittent operation of the windshield wiper system and, subsequently, turned-off The repetition rate is selected merely through actuation of a single, momentary contact switch requiring minimal action on the part of the user and little distraction to the user when concentrating on other activities, such as operating the motor vehicle.

The apparatus 10 here further includes a standard speed selector 36, operable in conventional manner, to permit operation of the windshield wiper system in conventional manner, that is to say, to set the wiper motor at a fixed, low-speed or high-speed rate of operation. In one implementation, if the user sets the wiper blade motion using the standard speed selector 36, intermittent operation is overridden with the selected standard speed.

Figure 2:
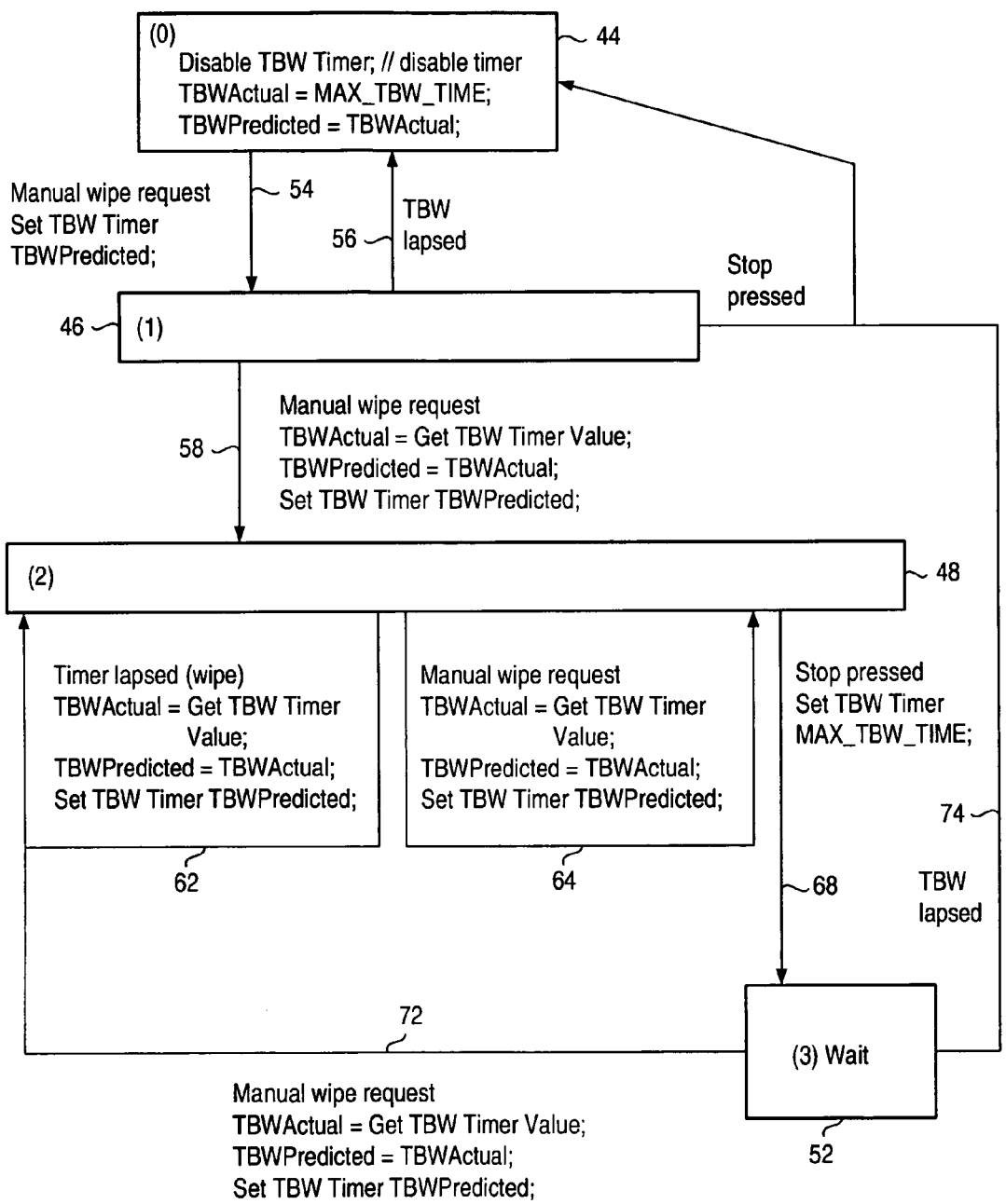
FIG. 2 illustrates a state diagram representative of an embodiment of the present invention.

FIG. 2 illustrates a state diagram, shown generally at 42, representative of operation of an embodiment of the present invention. The state diagram forms a state representation having four states, states 44, 46, 48, and 52. Implementation of the state representation in physical structure is straightforward either as a hardware device or by way of algorithms executable by processing circuitry.

The first state 44 represents a starting state and the state to which operations return upon inactivity of the apparatus. At the first state, the timer is disabled, indicated by "disable TBW timer" in the figure. And, variables, TBW actual and TBW predicted are set to be, respectively, MAX_TBW_TIME and TBW actual.

Entry into the second state 46 from the first state 44, indicated by way of the path 54, occurs when a manual wipe request is detected. With reference to the implementation shown in FIG. 1, the manual wipe request is made by a user through actuation of the first contact switch 22. In the exemplary implementation, upon detection of the wipe request, the wiper blade is caused to perform a wiping motion across the windshield, or other, surface. In the event that subsequent to detection of the first manual wipe request, when in the second state 46, no further wipe request is detected within the timing out period of the timer, a return is made, indicated by the TBW lapsed segment 56, to the first state 44.

If, however, while in the second state, a manual wipe request is detected, a path 58 is taken to the third state 48. And, when entering the third state, values of parameters are set. A TBW actual value is set to get TBW timer value, a TBW predicted value is set to TBW actual, and the TBW timer is set to a TBW predicted value.

In the third state, if no other switches are actuated, the wiper time is thereby set to the time between requests, and the wiper blade shall subsequently automatically perform the wiping motions at the corresponding time intervals. The path 62 is representative of the wiping motion carried out by the wiper blade at the successive intervals. And, variables are set as indicated. A TBW actual value is set to get TBW timer value. A TBW predicted value is set to a TBW actual value, and a TBW timer value is set to the TBW predicted value.

If, while in the third state 48, an additional wipe request is detected, a path 64 is taken. Time elapsing between a prior movement of the wiper blade and the additional manual wipe request is loaded as a new time period to be used to define the repetition rate at which the wiper blade is to carry out its wiping motion. This additional manual wipe request is, in essence, interpreted to form a new user selection of the repetition rate. Parameters are again set in this path. The TBW actual value is set to a get TBW timer value, and TBW predicted value is set to a TBW actual value, and the TBW timer is set to the TBW predicted value.

If, while in the third state 48, a stop, i.e., terminate intermittent operation request is detected, the path 68 is taken to the fourth state 52. The fourth state forms a wait state. Two paths extend from the wait state, a path 72 that extends back to the third state, and a path 74 that extends back to the first state 44. When entering the fourth state 52, the TBW timer is set to a maximum time between wiper blade motions, and upon timing out of the timer, the path 74 is taken back to the first state 44. However, while in the fourth state 52, if an additional wipe request is detected, the path 72 is taken back to the third state 48. Thereby, upon detection of actuation of the stop request, a delay period expires before returning to the initial or inactive state 44.

Figure 3:
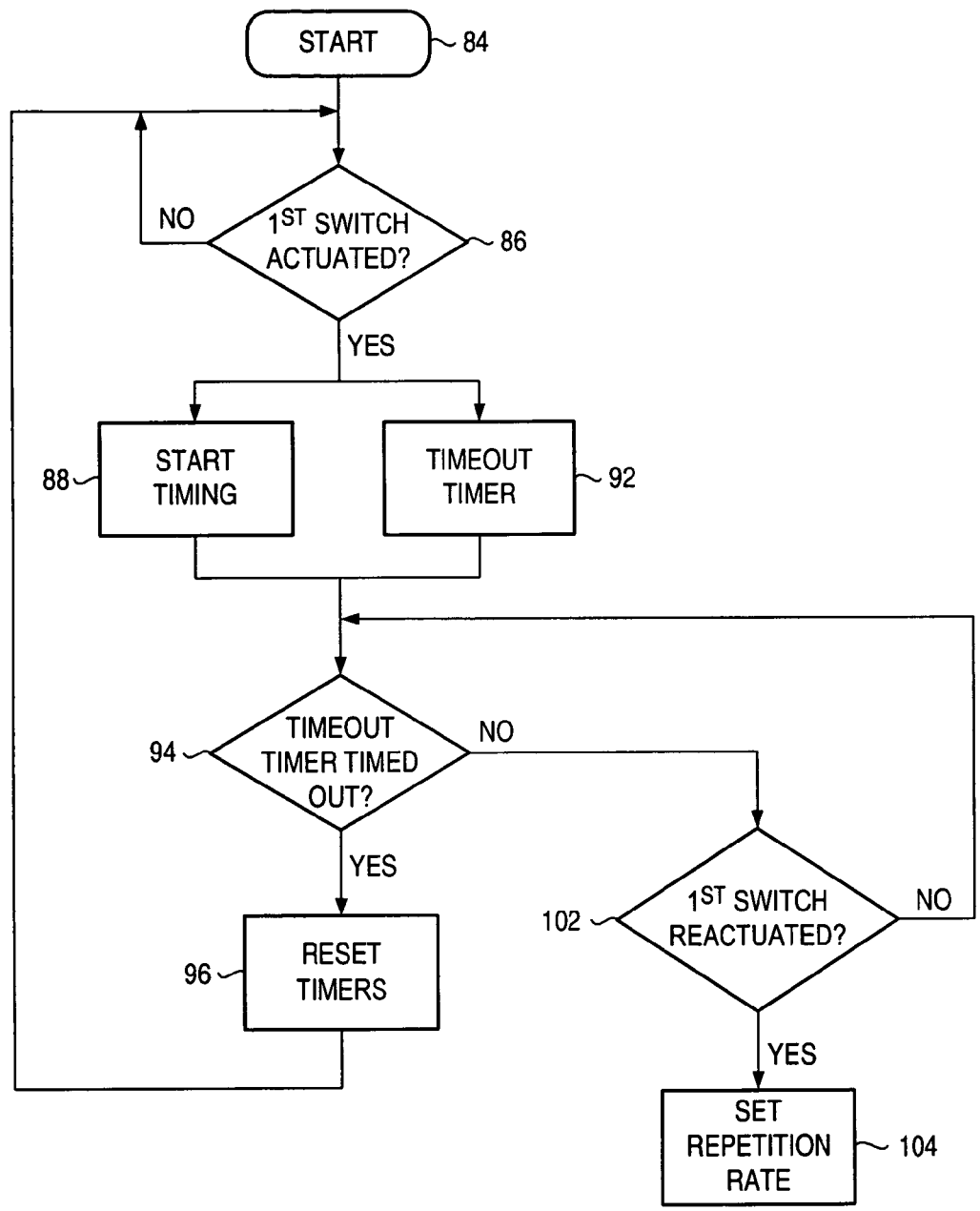
FIG. 3 illustrates a process diagram representative of the process carried out pursuant to an embodiment of the present invention.

FIG. 3 illustrates a process 82 of operation of an embodiment of the present invention. The process starts at the start block 84. First, and as indicated by the decision block 86, a determination is made as to whether a first switch is actuated. If not, the no branch is taken back to the decision block. If, however, the first switch is actuated, the yes branch is taken and timing commences, indicated by blocks 88 and 92. The block 88 is representative of commencement of a timing period, and the block 92 is representative of commencement of a time-out period.

A path is then taken to the decision block 94 at which a determination is made whether the time-out timer has timed out. If so, the yes branch is taken to the block 96, and the timers are re-set. Then a branch is taken back to the block 86.

If, conversely, the time-out timer has not timed out, the no branch is taken to the decision block 102 at which a determination is made as to whether the first switch has been reactuated. If not, the no branch is taken back to the decision block 94. Otherwise, if the first switch has been reactuated, the yes branch is taken to the block 104. And, the repetition rate, corresponding to the time period commencing with the start of the timing at the block 88 and the detection of the reactuation of the first switch, of the wiper blade is set.

Figure 4:
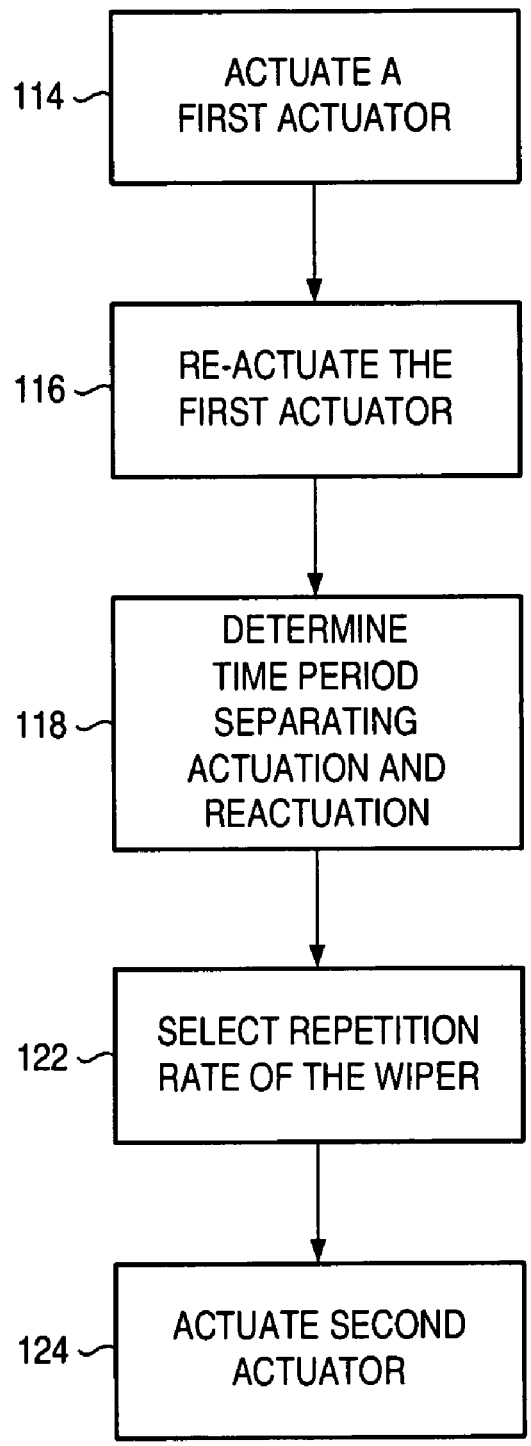
FIG. 4 illustrates a method flow diagram representative of the method of operation of an embodiment of the present invention.

FIG. 4 illustrates a method flow diagram, shown generally at 112, representative of the method of operation of an embodiment of the present invention. The method controls intermittent movement of a wiper blade of a wiper.

First, and as indicated by the block 114, a first actuator is actuated. Then, and as indicated by the block 116, the first actuator is re-actuated.

A determination is made, indicated by the block 118, of a time period separating the actuation of the first actuator and its re-actuation. Then, and as indicated by the block 122, intermittent movement of the wiper blade is selected at a rate responsive to the determined time period.

Then, and as indicated by the block 124, a second actuator is actuated to terminate the intermittent movement of the wiper blade.

Thereby, merely through successive actuation of a first actuator, the repetition rate of a wiper blade is set, permitting its intermittent operation. And, actuation of a second actuator terminates the intermittent operation of the wiper blade when no longer needed.

The previous descriptions are of preferred examples for implementing the invention, and the scope of the invention should not necessarily be limited by this description. The scope of the present invention is defined by the following claims.

What is claimed is:

1. Apparatus for providing user control of intermittent movement of a wiper blade of a vehicular windshield wiper, said apparatus comprising:

a first actuator actuable to request a motion of the wiper blade;

a timer adapted to receive indications of actuation of said first actuator, said timer configured to determine a time period between two successive actuations of said first actuator;

a wiper blade movement controller adapted to receive indications of actuation of said first actuator and the time period determined by said timer, said wiper blade movement controller configured selectably to cause intermittent movement of the wiper blade responsive to each actuation of said first actuator and, subsequent to the two successive actuations of the first actuator at a repetition rate responsive to the time period determined between the two successive actuations by said timer.

2. The apparatus of claim 1 wherein said first actuator comprises a momentary contact switch.

3. The apparatus of claim 1 wherein said timer is configured to determine the time period when the two successive actuations of said first actuator occur within a selected time-out period of said timer.

4. The apparatus of claim 3 wherein the repetition rate at which said wiper blade movement controller causes intermittent movement of the wiper blade corresponds to the time period determined by said timer.

5. The apparatus of claim 3 wherein timing of the selected time-out period of said timer commences with a most-recent actuation of said first actuator.

6. The apparatus of claim 1 wherein the repetition rate at which said wiper blade movement controller causes the intermittent movement of the wiper blade corresponds to the time period determined by said timer.

7. The apparatus of claim 1 further comprising a second actuator actuable by the user to request termination of intermittent movement of the wiper blade.

8. The apparatus of claim 7 wherein said second actuator comprises a momentary contact switch.

9. The apparatus of claim 7 wherein said timer is adapted to receive indication of actuation of said second actuator, said timer configured to reset responsive to the indication of the actuation of said second actuator.

10. The apparatus of claim 7 wherein said wiper blade movement controller is adapted to receive indication of actuation of said second actuator, said wiper blade movement controller further configured to terminate the intermittent movement of the wiper blade responsive to the indication of the actuation of said second actuator.

11. The apparatus of claim 7 wherein said wiper blade movement controller is adapted to receive indication of actuation of said second actuator, said wiper blade movement controller further configured to prevent movement of the wiper blade responsive to the indication of the actuation of said second actuator.

12. The apparatus of claim 11 wherein, subsequent to prevention of movement of the wiper blade caused by said wiper blade movement controller responsive to reception of the indication of actuation of said second actuator, said wiper blade movement controller causes a subsequent motion of the wiper blade responsive to subsequent actuation of said first actuator.

13. The apparatus of claim 1 wherein the rate at which said wiper blade movement controller causes the intermittent movement of the wiper blade is responsive to time between two most recent of the two successive actuations of said first actuator.

14. A windshield wiper delay system for providing intermittent wiper blade wiping operation, said windshield wiper delay system comprising:

a set of input actuators including a first input actuator and a second input actuator; and a controller adapted to receive indications of actuation of the first input actuator and the second input actuator of said set of input actuators, said controller configured to command intermittent wiper blade movement responsive to each actuation of the first input actuator and at a rate responsive to the elapsed time between two successive actuations of the first input actuator and to terminate the intermittent wiper blade movement responsive to actuation of the second input actuator.

15. A method for controlling intermittent movement of a wiper blade of a windshield wiper, said method comprising the operations of:

actuating a first actuator;

causing movement of the wiper blade responsive to actuation of the first actuator;

reactuating the first actuator;

causing movement of the wiper blade responsive to reactuation of the first actuator;

determining a time period separating actuation of the first actuator during said operation of actuating and during said operation of reactuating;

selecting a repetition rate for intermittent movement of the wiper blade responsive to the time period determined during said operation of determining; and causing movement of the wiper blade at a rate responsive to the repetition rate.

16. The method of claim 15 further comprising the operation of terminating the intermittent movement of the wiper blade.

17. The method of claim 16 further comprising the operation of actuating a second actuator and wherein said operation of terminating is performed responsive to actuating the second actuator.

18. The method of claim 15 further comprising the operation of causing movement of the wiper blade responsive to actuation of the first actuator.

19. The method of claim 15 wherein the repetition rate for intermittent movement of the wiper blade is selected during said operation of selecting if said operation of reactuating is performed within a selected time period subsequent to said operation of actuating.

* * * * *